United States Patent [19]
Nicholas

[11] Patent Number: 5,132,677
[45] Date of Patent: Jul. 21, 1992

[54] ACTIVE MATRIX-ADDRESSED DISPLAY DEVICES

[75] Inventor: Keith H. Nicholas, Reigate, England

[73] Assignee: U.S. Philips Corporation, New York, N.Y.

[21] Appl. No.: 465,690

[22] Filed: Jan. 16, 1990

[30] Foreign Application Priority Data

Jan. 18, 1989 [GB] United Kingdom ............... 8901037

[51] Int. Cl.$^5$ .................................................. C09G 3/36
[52] U.S. Cl. ...................................... 340/784; 359/59
[58] Field of Search .............. 350/333, 332, 334, 331; 340/784, 765, 719

[56] References Cited

U.S. PATENT DOCUMENTS

| | | | |
|---|---|---|---|
| 4,368,523 | 1/1983 | Kwate | 350/333 |
| 4,680,580 | 7/1987 | Kawahara | 340/784 |
| 4,804,953 | 2/1989 | Castleberry | 340/784 |
| 4,820,222 | 4/1989 | Holmberg et al. | 340/784 |
| 4,822,142 | 4/1989 | Yasui | 340/784 |
| 4,936,656 | 6/1990 | Yamashita et al. | 350/333 |

FOREIGN PATENT DOCUMENTS 0007344 1/1984 Japan .
2115199 2/1983 United Kingdom .

Primary Examiner—Alvin E. Oberley
Assistant Examiner—Doon Yue Chow
Attorney, Agent, or Firm—Bernard Franzblau

[57] ABSTRACT

An active-matrix addressed LC display device includes a row and column array of display elements (12) each controlled by two transistors (TA, TB) selectively operable by switching signals applied to respective adjacent row conductors (R) to supply to the display elements data signals from column conductors (C). Each row conductor (R) is associated with two rowss of display elements (12) and each display element has a storage capacitor (SC). The storage capacitors of each row of display elements are provided by a respective supplementary conductor (RS) extending beneath, and insulated from, electrodes (14) of the display elements. A supplementary conductor is formed as an extension of a row conductor (R) associated with a preceding pair of adjacent rows of display elements. The supplementary conductors are interconnected to their row conductors at one end of the rows, and preferably, for redundancy purposes, also at the other end, by respective bridges (30, 31).

15 Claims, 2 Drawing Sheets 5,132,677

ACTIVE MATRIX-ADDRESSED DISPLAY DEVICES

BACKGROUND OF THE INVENTION

This invention relates to an active matrix-addressed display device. More particularly, the invention is concerned with an active matrix-addressed liquid crystal display device comprising a row and column array of display elements having first and second spaced electrodes with liquid crystal therebetween, a plurality of row and column conductors to which switching signals and data signals are applied respectively with each row conductor being associated with two adjacent rows of display elements, each display element being associated with two transistors connected to two different row conductors for controlling the application of data signals to tis first electrode and having a respective storage capacitor connected to the outputs of the two transistors.

Active matrix-addressed display devices using switching transistors are well known. In their simplest form, a single transistor acting as a switch is sued for each display element with its drain electrode connected to an electrode of the element. The source electrodes of all transistors in the same column are connected to a respective one of a set of column conductors to which data signals are applied and the gate electrodes of all transistors in the same row are connected to a respective one of a set of row conductors to which switching (gating) voltages are applied to control switching of the transistors. The row conductors are conductors are scanned one at a time in sequential fashion with the switching voltage so as to turn on all transistors in each row in turn, with data signals being applied to the column conductors appropriately in synchronism for each row in turn, so as to build up a display. When the transistors are on, the data signals are supplied to the associated display element electrodes, thus charging up the display elements. When the transistors are turned off, upon termination of the switching voltage, and the application of a suitable "off" voltage to the row conductor, the charge is stored in the display elements concerned until the next time they are addressed with a switching voltage, usually, in the case of a video display, in the next field period.

Such an active matrix addressed liquid crystal display device is capable of displaying TV pictures. The transistors may be bulk transistors, e.g., MOSFETs, formed on a semiconductor substrate of the device. For large area display devices, TFTs deposited on a glass substrate are normally used. With the increasingly larger display areas now being proposed, there comes a corresponding increase in the number of display elements, and hence switching transistors, required.

A major problem in making large area display devices of this kind is yield. A discontinuity in a row conductor or just a few defective transistors can render the device unacceptable. Depending on the nature of the defect, even one defective transistor can lead to complete rows or columns of display elements being unusable.

The kind of display device mentioned in the opening paragraph, having two transistors for each display element, which are connected to respective, different, row conductors, is advantageous in this respect as a degree of redundancy is afforded. Considering one display element, and assuming both associated transistors and their respective row conductors are not faulty, one transistor operates to load the display element with a data signal voltage during a row address period and thereafter, during a subsequent row address period, the other transistor operates to over-write the data voltage with fresh data signal voltages until the one transistor is again operated. In the event of one of the two transistors proving to be defective or one of the two row conductors concerned having a discontinuity which leads to an open circuit condition, the display element is nonetheless driven to provide a display effect by virtue of the operation of the other transistor. Although two successive display elements in the column concerned may therefore produce the same display effect this is hardly perceptible. A display device of this kind is described in GB-A-2115199.

Liquid crystal materials typically exhibit less than ideal resistivity and dielectric properties. Accordingly, to compensate for charge leakage in the display elements between addressing, storage capacitors are often desirable for acceptable display performance, particularly for a display device which is to be used in a projection LC-TV system where deterioration in the transmission characteristics of a display element over a field period would be more noticeable. In the display device described in GB-A-2115199, a storage capacitor is provided for each display element, with one side of the storage capacitor being connected to the drains of the two transistors associated with the display element. The other side of all the storage capacitors associated with the rows of display elements are interconnected and maintained at a fixed potential. Although this arrangement in theory provides operational advantages, the provision of such storage capacitors necessarily complicates fabrication of the display device. Indeed, GB-A-2115199 is silent as to how these capacitors could be formed.

OBJECT AND SUMMARY OF THE INVENTION

It is an object of the present invention to provide an active matrix-addressed display device using the above-described kind of redundancy addressing scheme in which storage capacitors are provided in a relatively simple and convenient manner.

According to the present invention, an active-matrix addressed display device of the kind described in the opening paragraph is characterized in that for each of at least some of the rows of display elements, the associated storage capacitors are formed by a respective supplementary row conductor extending under, and insulated from, the first electrodes of the display elements, and which is electrically interconnected with the row conductor associated with a preceding pair of adjacent rows of display elements. Preferably, the supplementary row conductor is interconnected with the row conductor associated with the immediately preceding two adjacent rows of display elements.

In this way, storage capacitors are formed in a simple and convenient manner. The first electrodes of the display elements are used as on side of the capacitors. By electrically connecting the underlying supplementary conductors, forming the other sides of the capacitors, with a preceding row conductor not associated with the driving of the row of display elements concerned, a predetermined reference voltage, corresponding to the "off" voltage applied to the row conductors during non-address periods, is established at one side of the storage capacitor. Because the row conductor thus connected to the storage capacitor associated with a particular display element and the two row conductors used in the addressing of that display element are different, the voltage established at one side of the storage capacitor is not affected by the operation of the two row conductors used in addressing the display element.

In a preferred embodiment, the interconnection between each supplementary row conductor and its respective row conductor is provided at one end of the row of display elements. Each supplementary conductor may also be interconnected with its respective row conductor at the other end of the row as well. This arrangement provides fault tolerance in the event of row conductor discontinuities in a very convenient manner. If, for example, a row conductor is broken at some point along its length, switching signals are still provided to the transistors beyond the discontinuity by virtue of the associated supplementary conductor. Similarly, if the supplementary conductor is discontinuous, the supply of the reference voltage to one side of those storage capacitors located beyond the discontinuity is maintained by virtue of the interconnection at the other end of the supplementary conductor with its associated row conductor.

The two transistors associated with each display element may be connected to the same column conductor. However, in a preferred embodiment, the two transistors associated with each display element are connected to respective, different, column conductors as well as respective, different, row conductors, thus providing redundancy should one of the column conductors suffer a discontinuity at some point along its length. With a color display device in which each one of a group of three adjacent display elements displays a respective one of the tree primary colours, and in which diagonally adjacent display elements display the same color component, a further benefit is obtained in that if a display element's correct row conductor, column conductor or switching transistor is effectively open circuit the display element will produce, through the operation of its associated second switching transistor, the same display effect as that of the nearest display element of the same color.

BRIEF DESCRIPTION OF THE DRAWING

An active matrix-addressed liquid crystal display device in accordance with the invention will now be described, by way of example, with reference to the accompanying drawings, in which.

DESCRIPTION OF THE PREFERRED EMBODIMENTS

Figure 1:
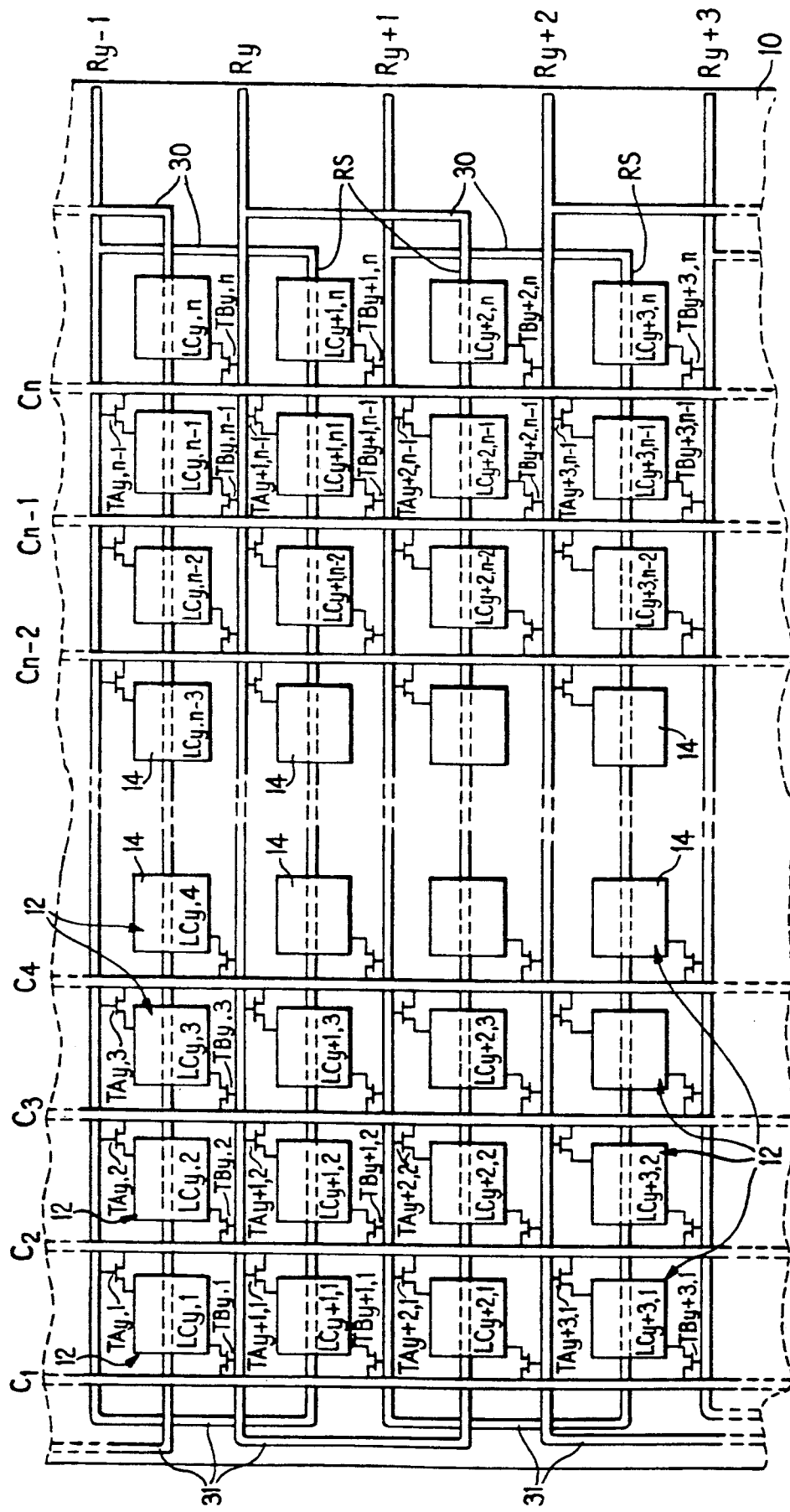
FIG. 1 is a schematic plan view of a part of the display device showing four adjacent rows of display elements and their associated addressing transistors and conductors.

Referring to FIG. 1, the active matrix-addressed display device, which is suitable for displaying TV pictures, comprises m rows (1 to m) with n horizontally arranged display elements 12 (1 to n) in each row. Only four rows, y to y+3 where m>y>1, and a few of the display elements in each row are shown for clarity. In practice, the total number of display elements (mxn) in the matrix array may be 200,000 or more. The display elements are referenced LCy,x where y and x designate their row and column positions respectively. The display elements are addressed via sets of row and column conductors, here referenced R and C, which extend in spaces between the display elements. For redundancy purposes all rows of the display elements except the first are associated with two row conductors. Similarly, all display elements apart from those in column n are associated with two column conductors. The application of data (video) signals to each of these display elements is controlled by switching elements in the form of transistors, designated TAy,x and TB,y,x, connected to respective ones of the pairs of row and column conductors associated with the display element. The display elements of the first row and of the last column, being associated only with a single row conductor and, a single column conductor respectively are, accordingly, associated with a single switching transistor. For all other rows and columns the switching transistors associated with the display elements of each individual row are connected to a respective common pair of row conductors. Likewise the switching transistors associated with all the display elements in the same column are connected to the same respective common pair of column conductors. The switching transistors in this embodiment comprise TFTs fabricated in a conventional manner using amorphous silicon or polysilicon technology. The gate and source terminals of the TFTs are connected to their associated row and column conductors, respectively.

Figure 3:
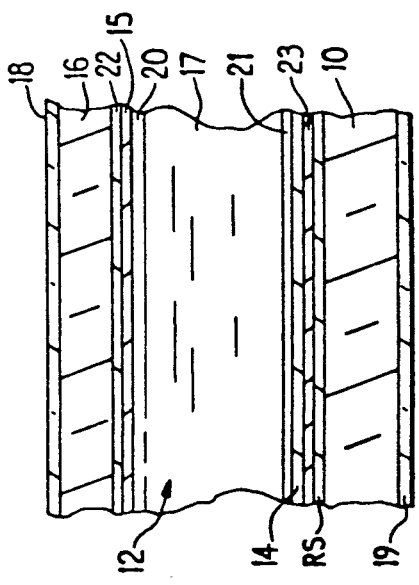
FIG. 3 is a schematic cross-section through a central region of a typical display element.

Referring also to FIG. 3, a typical display element 12 comprises a transparent drive electrode 14, (shown as a simple square in FIG. 1), which is carried on a transparent substrate 10 of the display device together with the row and column conductors and the TFTs and which is connected to the drain terminals of its associated two switching transistors, and an opposing transparent electrode 15 carried on a second, spaced, transparent substrate 16 with liquid crystal material 17 disposed therebetween. The opposing electrodes of the display elements on the second substrate comprise individual portions of a common counter electrode coextensive with the are occupied by the drive electrodes in the usual way. The two substrates, which may be of glass, are provided with polarizing layers 18 and 19 and orientation layers 20 and 21 in the conventional manner. The liquid crystal material serves to modulate light transmitted through the display elements according to a data voltage applied thereto with each display element being operable to vary the light transmission individually through the device in accordance with the voltage applied across its respective electrodes.

For producing a colour display, each display element is registered with a colour filter 22 in known manner with groups of three adjacent display elements each providing a colour triplet. The triplets are arranged such that diagonally adjacent display elements in the array display the same primary colour, either red, green or blue.

In order to sustain the desired display effect from the display elements in the interval between their addressing, each display element is further associated with a storage capacitor which in effect, is connected to its drive electrode.

The storage capacitors are formed and interconnected as follows. Each of the row conductors R is formed together with an extension constituting a supplementary conductor, generally referenced RS, during its fabrication on the substrate 10 by deposition and definition techniques. Each of these supplementary conductors extends as a strip electrode parallel to, and displaced a predetermined distance, from, the row conductor and has a respective bridging portion 30 connecting the strip electrode to the row conductor at one end. The supplementary conductor RS is spaced from the row conductor R by a distance greater than the distance between two consecutive row conductors but less than the distance between three consecutive row conductors so that, in relation to the subsequently formed drive electrodes of the display elements, it extends beneath the drive electrodes of the next row of display elements in the series to be addressed following those rows of elements with which that row conductor R is associated. In other words, each supplementary conductor lies under the next but one row of drive electrodes from its interconnected row conductor. In the particular example shown in FIG. 1, the supplementary conductors are positioned approximately mid-way across the overlying drive electrodes.

Because the bridging portions 30 and the row conductors cross one another, groups of these portions and the row conductors are fabricated in successive stages with separating insulator material deposited at the appropriate regions, as will be apparent to persons skilled in the art.

The supplementary conductors RS are separated from their respective rows of drive electrodes 14 by an intervening transparent insulating layer, shown at 23 in FIG. 3, acting as a dielectric. Overlying portions of the supplementary conductors and drive electrodes overlying one another thus constitute capacitors which are effectively connected at their one side to a drive electrode and at their other side to the preceding but one row conductor.

In operation, the display elements are driven on a row at a time basis by scanning the row conductors R sequentially with a switching signal starting form the uppermost row downwards so as to turn on the switching transistors in each row in turn and by applying data signals to the column conductors as appropriate and in synchronism with the switching signals so as to build up a complete display picture. In the case of a TV display, the data signals comprise video information signals and each row of display elements is provided with video information signals corresponding to a TV line. Using one row at a time addressing, each of the groups of switching transistors TAy,x and TBy,x associated with a single row of display elements is switched on for a time period Tl during which video information signals are transferred from the column conductors related to those transistors to the display elements and their storage capacitors. During the remainder of the field period Tf (Tf being approximately equal to m.Tl) the transistors are turned off and serve to isolate the display elements, and the storage capacitors, from the column conductors.

More precisely, each row of display elements is addressed by scanning two consecutive row conductors for redundancy purposes.

Consdiering, for example, the second row (y+1) of display elements in FIG. 1, comprising LCy+1, 1 to LCy+1, n, a switching signal Von applied to the row conductor Ry serves to turn on the transistors TAy+1, 1 to TAy+1, n−1 allowing the video information signals then appearing on the column conductors C2 to Cn to be supplied to the display elements LCy+1, 1 to LCy+1, n−1 respectively and to their associated storage capacitors. Because the row conductor Ry is connected also to the switching transistors (TBy,1 to TBy,n) for the preceding row of display elements (LCy,1 to LCy,n) these elements and their storage capacitors are similarly supplied with the corresponding video information voltages. Thereafter, the switching signal Von is removed from the row conductor Ry and a reference voltage signal $V_{off}$ is applied which turns off the transistors TAy+1,1 to TAy+1,n−1 (and likewise the transistors TBy,1 to TBy,n) thereby isolating the storage capacitors for the display elements LCy+1,1 to LCy+1,n−1 (and LCy,1 to LCy,n respectively). Simultaneously, the switching signal Von is applied to row conductor Ry+1 so as to turn on the transistors TBy+1,1 to TBy+1, n thereby allowing the video information signals now present on the column conductors C1 to Cn to be supplied to the storage capacitors for the display elements LCy+1,1 to LCy+1, n respectively. The previously loaded video information of the elements is thus overwritten with the values properly intended for these elements. Similarly, the switching signal Von applied to row conductor Ry+1 also causes the transistors TAy+2,1 to TAy+2,$_{n-1}$ of the succeeding display element row to be turned on so that the same video information signals on column conductors C2 to C$_n$ are supplied also to the storage capacitors of elements LCy+2,1 to LCy+2,$_{n-1}$ respectively.

Upon subsequently returning the voltage applied to row conductor Ry+1 from Von to Voff, and applying the switching voltage signal Von to the next row conductor Ry+2, the transistors TBy+1 to TBy+1, n are turned off to isolate the display elements LCy+1,1 to LCy+1, n and their associated storage capacitors so that the last applied video information signals are retained and, in conjunction with a reference voltage applied to the opposing electrodes of the elements, the desired display effect is achieved from the elements.

It is seen, therefore, that within two line address periods, corresponding to 128 microseconds for a PAL system TV display, the row of display elements LCy-30 1,1 to LCy+1,n are firstly loaded with respective video information signals applied also to, and intended primarily for, the corresponding but one display element of the preceding row (apart, that is, from LCy+1, n) and then secondly loaded with video information signals specifically intended for the display elements of that row. Hence, in the event of one of the transistors TBy+1,1 to TBy+1, n proving defective and being open circuit, preventing the supply of the proper video information signal to the display element effected, that display element will continue to produce a display in accordance with the video information signal loaded vis its other transistor. The display element affected will in these circumstances therefore produce a display effect which is the same as that provided by a diagonally adjacent display element of the preceding row. As diagonally adjacent display elements display the same color the affected display element will in operation produce the same display effect as its closest display element of the same colour. If a transistor fails closed circuit, it can be disconnected by laser scribing or the like, thus effectively producing an open circuit type failure.

It will be appreciated that when a row of display elements is being addressed and loaded with video information, the side of each of the storage capacitors for that row, constituted by portions of the supplementary conductor RX, is provided with the fixed, predetermined, voltage then being supplied to the preceding but one row conductor, namely Voff.

The row conductors R are scanned in turn so that the above-described driving scheme is repeated for each row of display elements in turn, the display effect produced by the elements being maintained until they are next addressed in a subsequent field period.

In this particular embodiment the display elements of the first row and the last column are each controlled through only one transistor connected to a single row and a single column conductor. Should one of these transistors be defective, complete failure of the individual elements of the entire row or column might occur. However, this possibility is not critical as the elements concerned are at the periphery of the display area and would normally be masked from view anyway.

In a modified form of the display device, the first row of display elements are also each associated with two switching transistors. This is achieved by providing an additional row conductor so that the number of row conductors exceeds the number of rows of display elements by one.

The drive signals applied to the row and column conductors are generated in a conventional manner using any suitable known form of drive circuits.

Figure 2:
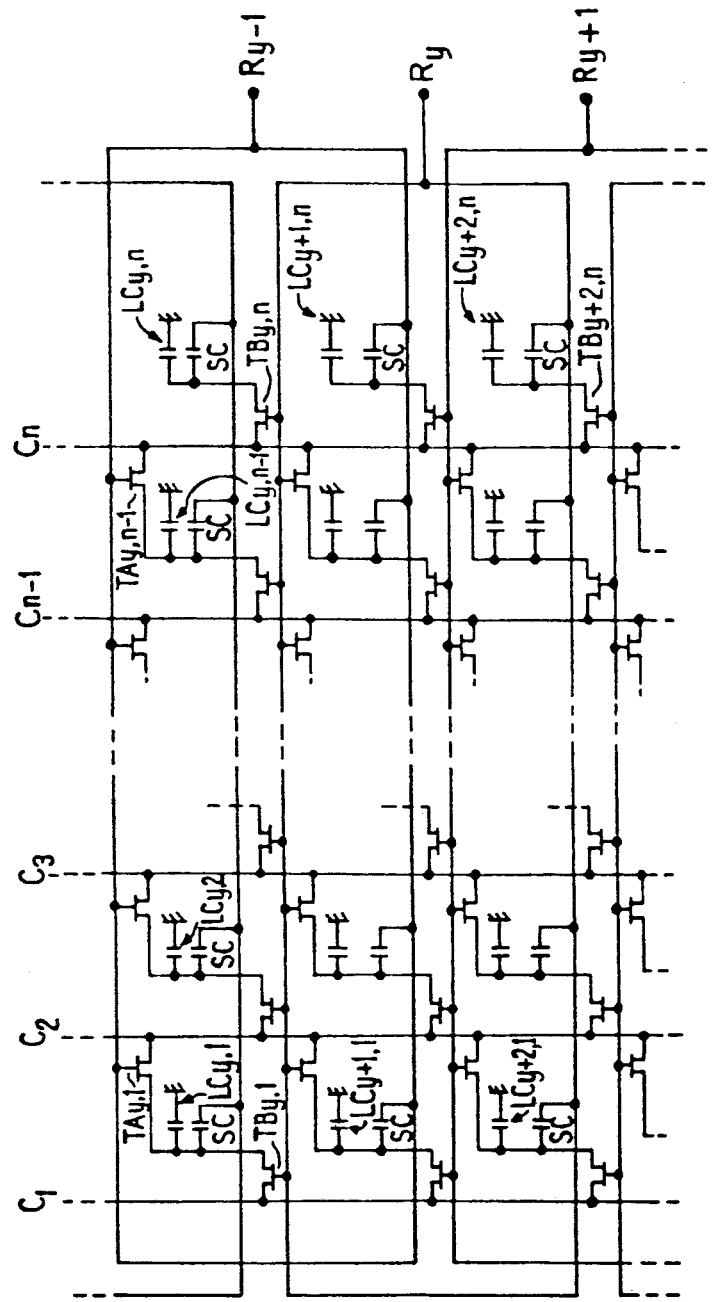
FIG. 2 is an equivalent circuit diagram of a few typical display elements of the device.

The effective equivalent circuit configuration for a few typical display elements is illustrated in FIG. 2. Here the same component designations are used as in FIG. 1. In addition, the storage capacitors are indicated by the reference SC.

Referring again to FIG. 1, the supplementary conductors RS are each further connected to their respective row conductors at their other ends through additional bridge portions 31. This provides redundancy in the event of row conductor discontinuities. If a break is present in a row conductor along its length, switching signals can nevertheless be supplied to transistors beyond the discontinuity via the supplementary conductor and the bridge 31. Similarly, in the event of a discontinuity in the supplementary conductor, operation of the storage capacitors beyond the discontinuity is maintained by supply of the voltage Voff from the row conductor via the bridge 31.

The row and column conductors, supplementary conductors, bridging portions, switching transistors and display elements can be fabricated using any suitable conventional technology, as will be apparent to persons skilled in the art.

I claim:

1. An active matrix-addressed liquid crystal display device comprising: a row and column array of display elements having first and second spaced electrodes with liquid crystal therebetween, a plurality of row and column conductors to which switching signals and data signals are applied respectively with each row conductor being coupled with two adjacent rows of display elements, each display element being associated with two transistors connected to two different row conductors for controlling the application of data signals to its first electrode and having a respective storage capacitor connected to outputs of the two transistors, wherein for each of at least some of the rows of display elements the associated storage capacitors comprise a respective supplementary row conductor extending under, and insulated from, the first electrodes of the display elements, which supplementary row conductor is electrically interconnected with row conductor associated with a preceding pair of adjacent rows of display elements.

2. A display device according to claim 1, wherein a supplementary row conductor is interconnected with a row conductor associated with the immediately preceding two adjacent rows of display elements.

3. A display device according to claim 1 or claim 2, wherein the electrical interconnection between each supplementary row conductor and its respective row conductor is provided at one end of the row of display elements.

4. A display device according to claim 3, wherein each supplementary row conductor is also interconnected with its respective row conductor at the other end of the row of display elements.

5. A display device according to claim 1, wherein the two transistors coupled with each display element are connected to respective different column conductors.

6. A display device according to claim 2, wherein the two transistors coupled with each display element are connected to respective different column conductors.

7. A display device according to claim 3, wherein the two transistors coupled with each display element are connected to respective different column conductors.

8. A display device according to claim 4, wherein the two transistors coupled with each display element are connected to respective different column conductors.

9. An active matrix-addressed liquid crystal display device comprising:
   first and second spaced apart transparent substrates supporting first and second spaced electrodes, respectively, and with a liquid crystal material sandwiched therebetween so as to form a row and column array of display elements,
   a plurality of spaced apart row conductors which receive switching signals in a given sequence and with each row conductor, except the first and last row conductor, located between two adjacent rows of said display elements,
   a plurality of spaced apart column conductors which receive data signals for energizing the display elements,
   a plurality of first transistors and a plurality of second transistors each having a control electrode, wherein said first and second transistors couple respective column conductors to respective first electrodes of the display elements and each row conductor, except the first and last row conductor, is coupled to control electrodes of respective first and second transistors that are coupled to two adjacent rows of display elements, and
   means providing a plurality of storage capacitors coupled to respective ones of said display elements, said plurality of storage capacitors comprising a further plurality of supplementary conductors laid out in rows extending under, and insulated from, the first electrodes of the display elements and with each supplementary conductor electrically connected to a row conductor located between a preceding pair of adjacent rows of display elements.

10. A display device as claimed in claim 9 wherein said supplementary row conductors form one electrode of the storage capacitors and the first electrodes of the display elements form second electrodes of the storage capacitors.

11. A display device as claimed in claims 9 or 10 wherein at least some of the supplementary row conductors are electrically connected with respective row conductors located between the immediately preceding pair of adjacent rows of display elements.

12. A display device as claimed in claim 11 wherein the electrical connections between supplementary row conductors and their respective row conductors comprise connection elements located at one end of the rows of display elements.

13. A display device as claimed in claims 9 or 10 wherein the electrical connections between supplementary row conductors and their respective row conductors comprise connection elements located at one end of the rows of display elements.

14. A display device as claimed in claim 13 wherein the first and second transistors coupled to a display element are connected to respective different column conductors.

15. A display device as claimed in claims 9 or 10 wherein the first and second transistors coupled to a display element are connected to respective different column conductors.

* * * * *